United States Patent [19]

Ogino et al.

[11] Patent Number: 4,919,518
[45] Date of Patent: Apr. 24, 1990

[54] MULTI-SCREEN PROJECTOR

[75] Inventors: Masanori Ogino, Yokohama; Hiroshi Kaiwa, Tokyo; Yoshiaki Iwahara, Yokosuka; Yuzo Tamura; Akio Yamamoto, both of Yokohama, all of Japan

[73] Assignee: Hitachi, Ltd., Tokyo, Japan

[21] Appl. No.: 338,208

[22] Filed: Apr. 14, 1989

[30] Foreign Application Priority Data

Apr. 15, 1988 [JP] Japan .................. 63-91369

[51] Int. Cl.⁵ .............................. G03B 21/60
[52] U.S. Cl. ........................ 350/128; 353/94
[58] Field of Search ............... 350/127, 128; 353/33, 353/30, 94

[56] References Cited

U.S. PATENT DOCUMENTS

| | | | |
|---|---|---|---|
| 1,938,950 | 12/1933 | Wright | 353/33 |
| 3,830,556 | 8/1974 | Bratkowski | 350/128 |
| 3,909,525 | 9/1975 | Fagan | 353/30 X |
| 4,166,694 | 9/1979 | Horning | 353/94 X |
| 4,374,609 | 2/1983 | Lange | 350/128 |
| 4,387,959 | 6/1983 | Lange et al. | 350/128 |
| 4,475,791 | 10/1984 | Nixon | 350/128 X |
| 4,512,631 | 4/1985 | Van Breemen | 350/128 |
| 4,536,056 | 8/1985 | Oguino | 350/128 |
| 4,725,134 | 2/1988 | Ogino | 350/128 X |

Primary Examiner—Richard A. Wintercorn
Attorney, Agent, or Firm—Antonelli, Terry & Wands

[57] ABSTRACT

A multi-screen projector composed of a plurality of unit module projectors piled up one upon another in the vertical direction. Each unit module projector includes a Fresnel lens sheet, lenticular sheet, and prism sheet interposed therebetween such that a light is incident to the Fresnel lens sheet and outputted from the lenticular sheet. The prism angle of the prism sheet of the unit module projector disposed at a higher position is set larger than that disposed at a lower position, and the main output light from the prism sheet is made at least parallel with the incident light direction or deflected downward relative to the incident light direction.

45 Claims, 8 Drawing Sheets

$$\tan\alpha = \frac{\sin\theta}{n\sin\left\{\cos^{-1}\left(\frac{\sin\theta}{n}\right)\right\} - 1}$$

MULTI-SCREEN PROJECTOR

BACKGROUND OF THE INVENTION

The present invention relates to a large screen projector, and more particularly to a multi-screen projector having a plurality of unit module projectors stacked one upon another.

A large screen projector of this type is known as disclosed, e.g., in the specification of U.S. Pat. No. 4,536,056 filed on Oct. 7, 1983, assigned to Hitachi, Ltd., and entitled as "Background Projector Apparatus". According to the teachings of this art, a background projector apparatus can be readily manufactured which has a screen size smaller than or equal to about 100 inches. However, a background projector apparatus having a larger screen greater than or equal to about 150 inches requires a considerably large size Fresnel lens so that such a large screen background projector apparatus is very difficult to be manufactured.

There is also known a configuration scheme wherein a plurality of small unit module projectors each having a screen size of about 40 inches are juxtaposed side by side and one upon another to form a single large size screen. With this module type configuration, however, a light applied to each unit module screen of the projectors juxtaposed in the vertical direction is emitted therefrom within the range of plus/minus 6 degrees in the vertical direction relative to the normal direction of the screen. Therefore, an image as viewed from audiences outside the directivity becomes dark. This problem can be solved by making the vertical directivity of each screen of a unit module projector as wide as about plus/minus 30 degrees. This solution however gives rise to another problem that the overall screen becomes dark.

SUMMARY OF THE INVENTION

It is therefore an object of the present invention to solve the problems associated with related art and provide a multi-screen projector having a large screen of relatively bright and good image quality as a whole, and less brightness difference between upper and lower unit module screens.

The above object can be achieved by providing each unit module with a novel prism means for controlling the vertical directivity characteristic of the unit module screen, and with a mechanism for tilting the entirety of the unit module screen.

The prism means joined to a unit module functions to refract a light in the vertical direction such that a unit module disposed at an upper position has a larger downward refractive index. The entirety of a unit module may be tilted if necessary. With this arrangement, the upper portion of the whole screen does not become dark as viewed from audiences at the lower position.

According to the present invention, a multi-screen projector having a large screen size and a good image quality can be realized with less unevenness of brightness throughout the whole screen and less degradation of contrast to be caused by external illumination light. In addition, a unit module screen is embodied by only adding a prism sheet to the screen of a commercial inexpensive projector, so that a multi-screen projector having an excellent performance can be realized with simple structure.

DESCRIPTION OF THE PREFERRED EMBODIMENTS

Preferred embodiments of the present invention will be described with reference to the accompanying drawings.

Figure 1:
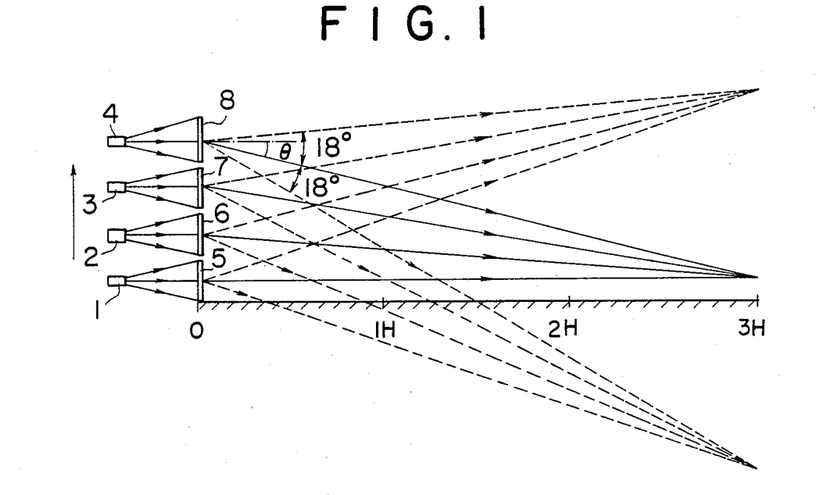
FIG. 1 is a schematic view used for explaining an embodiment of the multi-screen projector according to the present invention.

FIG. 1 is a schematic view illustrating a first embodiment of the multi-screen projector according to the present invention. The multi-screen projector is constructed of unit modules about 40 inches piled up to four stages one upon another (in the vertical direction).

In FIG. 1, reference numerals 1, 2, 3 and 4 represent a unit module projector, and reference numerals 5, 6, 7 and 8 represent a unit module screen which has a height of about 60 cm, giving a height of about 240 cm in total of the multi-screen projector. Four to six unit modules are also juxtaposed side by side (in the horizontal direction), giving a width of about 320 to 480 cm in total of the multi-screen projector. The audience coverage distance is graduated in the lateral direction with 1H, 2H and 3H where H is about 240 cm. In this embodiment, an output light from each module screen is regulated so that a fair image with least unevenness can be viewed at the position 3H remote from the screen. Solid arrows from unit module screens to 3H position represent paths of main output lights, and dotted line arrows represent the light diffusion range in the vertical direction.

Although not depicted in FIG. 1, red, green and blue three primary color projection tubes and three projection lenses are juxtaposed in the horizontal direction for each unit projector.

Figure 2A:
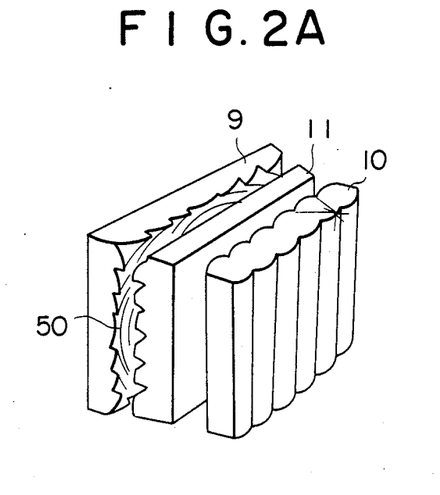
FIGS. 2A and 2B show the structure of a unit module screen, and a tilting mechanism for a unit module screen.

FIG. 2A shows the structure of a unit module screen wherein reference numeral 9 represents a Fresnel sheet, 10 a lenticular sheet, and 11 a prism sheet.

Figure 2B:
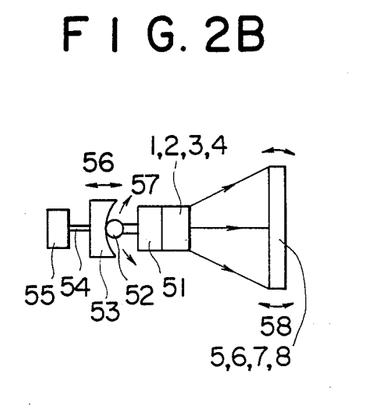

FIG. 2B shows an example of the structure of a tilting mechanism for a unit module screen. In FIG. 2B, reference numeral 51 represents a driver for driving a gear 52, and reference numeral 53 represents an arc gear meshing with the gear 52. Reference numeral 54 represents a shaft for causing the entirety of a unit module to move to the right and left as shown by a bidirectional arrow 56, and reference numeral 55 represents a driver for the shaft 54. As the gear 52 rotates, the gear 53 causes the gear 57 to move accurately as shown by a bidirectional arrow 57 so that a unit module screen 5, 6, 7, 8 is caused to tilt upward and downward as indicated by unidirectional arrows 58.

Figure 3:
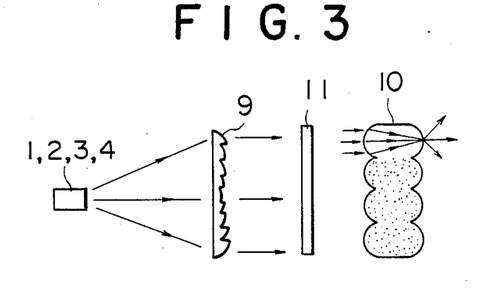
FIG. 3 is a schematic view used for explaining the operation of a Fresnel sheet and lenticular sheet.

FIG. 3 is a schematic diagram used for explaining the operation of the Fresnel sheet 9 and lenticular sheet 10. The Fresnel sheet 9 functions as a convex lens presenting a Fresnel lens function such that a light incident from the unit module projector to the Fresnel sheet 9 while diverging toward the whole area of a screen from the projector is transformed into an output parallel light. The lenticular sheet 10 is a so-called lenticular lens having a function to diffuse an incident light thereto in the horizontal direction. Particles of minute amount such as $SiO_2$ are contained in the lenticular sheet 10 to diffuse an incident light thereto in the horizontal and vertical directions within the range of about plus/minus 6 degrees. The details of the Fresnel sheet and lenticular sheet are disclosed in the specification of the above-referenced U.S. Pat. No. 4,536,056 so that a further description therefor is omitted.

In FIG. 3 showing a plan view of a unit module wherein light diffusion in the horizontal direction is illustrated, a prism sheet generally indicated at 11 constitutes a main part of this invention and joined as an intermediate sheet of the unit module. The prism sheet 11 refracts an incident light downward and make the diffusion range broad in the upward and downward directions. Light diffusion in the horizontal direction is carried out by the lenticular sheet 10 as shown in FIG. 3.

Figure 4:
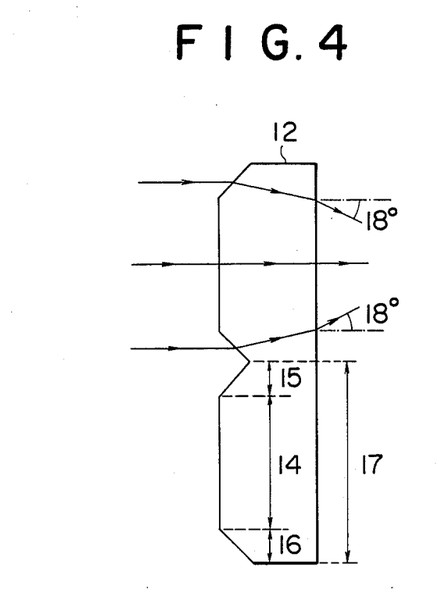
FIGS. 4 and 5 show the profiles of prism sheets in vertical cross section.
Figure 5:
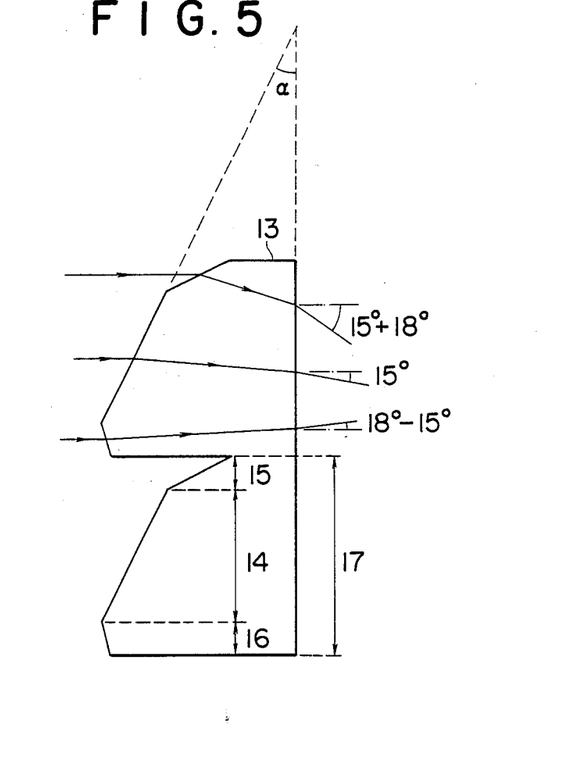

FIGS. 4 and 5 are the profiles in vertical cross section of the prism sheet shown in FIG. 3, each profile showing two elements of a prism sheet. FIG. 4 is the profile of a prism sheet used with the unit screen 5 disposed at the lowest stage shown in FIG. 1. FIG. 5 is the profile of a prism sheet used with the unit screen 8 disposed at the highest stage shown in FIG. 1. The prism sheet is constructed such that the prism angle α of a prism sheet provided at an upper unit module is larger than that at a lower unit module. The prism angle α of the prism sheet shown in FIG. 4 is 0 degree. Those prism sheets having intermediate prism angles between those shown in FIGS. 4 and 5 are used with the unit screens 6 and 7 disposed at the intermediate stages shown in FIG. 1.

Figure 6:
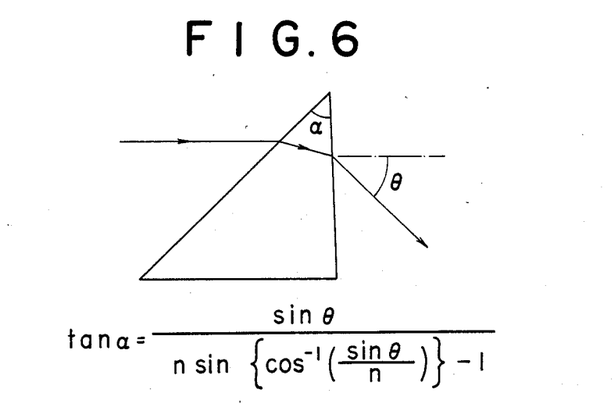
FIG. 6 illustrates the relation between a refractive index and prism angle.

FIG. 6 illustrates the relation between a refractive angle and the associated prism angle α. As written in FIG. 6, the following equation is given where n represents a refractive index of the prism material (acrylic material is commonly used which has a refractive index of about 1.5):

$$\tan \alpha = \frac{\sin \theta}{n \sin \left\{ \cos^{-1}\left(\frac{\sin \theta}{n}\right) \right\} - 1} \quad (1)$$

If θ (rad) is sufficiently smaller than 1, the following approximation stands:

$$\alpha \approx \frac{\theta}{n - 1} \quad (2)$$

The pitch between respective elements of a prism sheet is set at 0.85 mm as indicated at 17 in Figs. 4 and 5, and the thickness of a prism sheet is set at about 1 mm. The pitch between respective elements of a lenticular sheet is set at about 0.85 mm, and the thickness of a lenticular sheet is set at about 1 mm. The pitch between respective spirals of a Fresnel sheet is set about 0.113 mm as indicated at 50 in FIG. 2, and the thickness of a Fresnel lens is set at about 3 mm.

Figure 7:
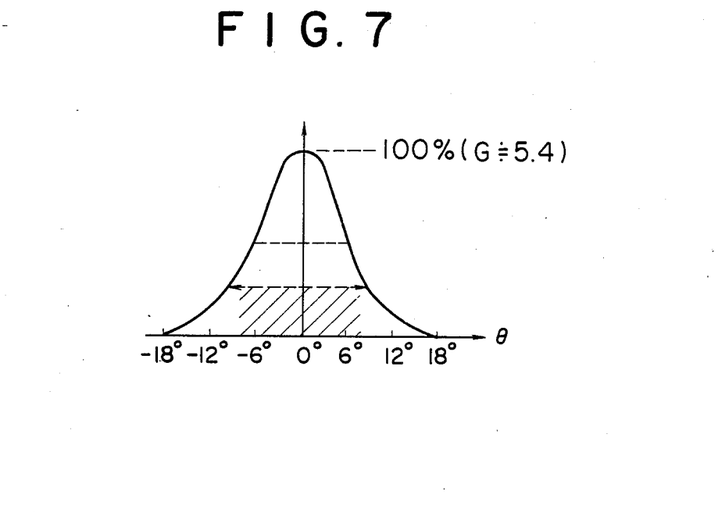
FIG. 7 is a graph showing the vertical directivity characteristic of a lenticular sheet.

FIG. 7 shows the vertical directivity characteristic of a lenticular sheet itself, the abscissa indicating the angle in the vertical direction relative to the screen normal direction, and the ordinate indicating a relative brightness. The angle θ=0° corresponds to the normal direction, with the positive angle indicating the upward direction and with the negative angle indicating the downward direction.

Figure 8:
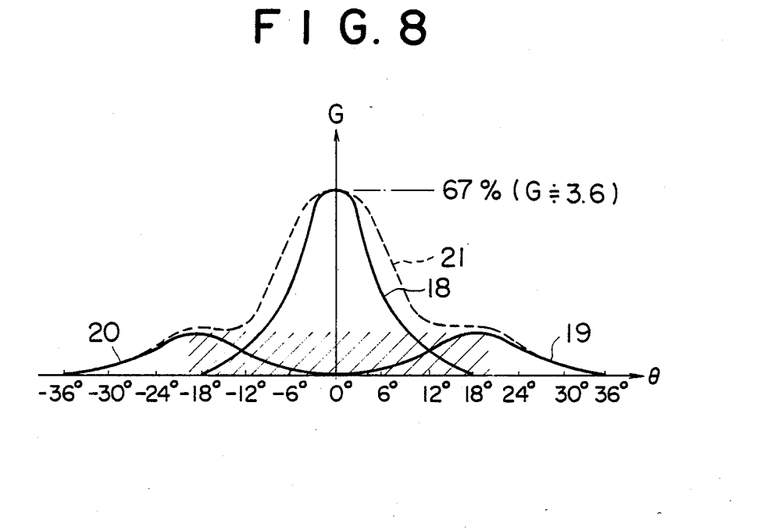
FIG. 8 is a graph showing the vertical directivity characteristic of the combination of a prism sheet having a cross section shown in FIG. 4 and a lenticular sheet.

FIG. 8 shows the vertical directivity characteristic of a lenticular sheet in combination with the prism sheet shown in FIG. 4. In this case, the main part 14 of the profile shown in FIG. 4 is set at 67% of the pitch (period) 17, and the side lobe parts 15 and 16 are each set at 16.5% of the pitch.

In FIG. 8, curve 18 represents the brightness at the main part 14, and curves 19 and 20 represent the brightness of the side lobe parts 15 and 16. The total directivity is given as the sum of these brightness curves and shown by a dotted line 21.

Figure 9:
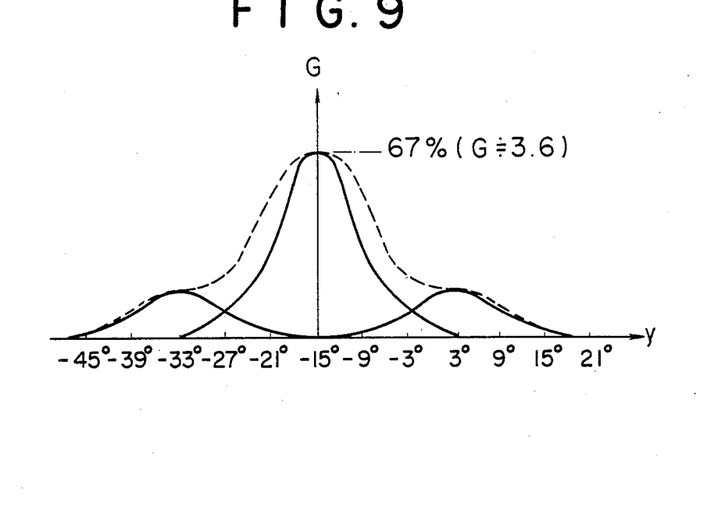
FIG. 9 is a graph showing the vertical directivity characteristic of the combination of a prism sheet having a cross section shown in FIG. 5 and a lenticular sheet.

FIG. 9 shows the vertical directivity characteristic of the unit module screen 8 which uses the prism sheet shown in FIG. 5. Similar to the characteristic curve shown in FIG. 8, the total directivity characteristic is indicated by a dotted line in FIG. 9. The light beams indicated by solid lines and dotted lines in FIG. 1 correspond to the main part and side lobe parts shown in FIGS. 4 and 5. The direction of light beams indicated by dotted lines is about plus/minus 18 degrees relative to that of light beams indicated by solid lines. The Fresnel sheets shown in FIGS. 2 and 3 transform an incident diverging light into an output parallel light, and are not concerned about the directivity of fine divergence of each pixel. Therefore, the directivity characteristic of the combination of a lenticular sheet and prism sheet becomes coincident with the total directivity characteristic of the unit module screen inclusive of a Fresnel sheet. The screen gain G of the light beams indicated by solid lines in FIG. 1 at the main part thereof takes a relatively large gain of about 3.6 as depicted in FIGS. 8 and 9, where the screen gain G is defined such that it takes a value 1 for the brightness of a screen with no loss and nondirectivity. The screen gain G of about 3.6 is about two thirds of that of a unit module screen composed of only two sheets, including the Fresnel sheet 9 and lenticular sheet 10 having the narrow vertical directivity as shown in FIG. 7, while excluding the prism sheet 11 shown in FIG. 2A. The effective angle range, assuming that the effective angle range ensures about one fifth of the peak gain, is as narrow as about plus/minus 9 degrees for the case of FIG. 9 as indicated by oblique lines, whereas the effective angle range is about two times as wide as plus/minus 20 degrees for the cases of FIGS. 8 and 9. Consequently, from the standpoint of figure of merit which is the product of the screen gain G and effective angle range, the prism sheets having the profiles shown in FIGS. 4 and 5 are very excellent for practical use.

The profiles shown in FIGS. 4 and 5 are defined by broken lines. However, curves analogous to broken lines may be used instead.

Depending upon application fields, the side lobe parts 15 and 16 may be omitted and the profile is defined only by the main part 14. However, in such a case, consideration should be made on the fact that the suitable audience coverage distance is limited near to 3H as shown in FIG. 1. The concentration of diffusion particles contained in the lenticular sheet 10 shown in FIG. 3 may be increased so as to use the particles as an alternative of the side lobe parts shown in FIGS. 4 and 5. However, if the concentration of diffusion particles are increased excessively, attention should be paid to the fact that the absorption loss caused by diffusion particles as well as the reflection loss caused by reflection of incident light at the interface of particles, will increase.

Figure 10:
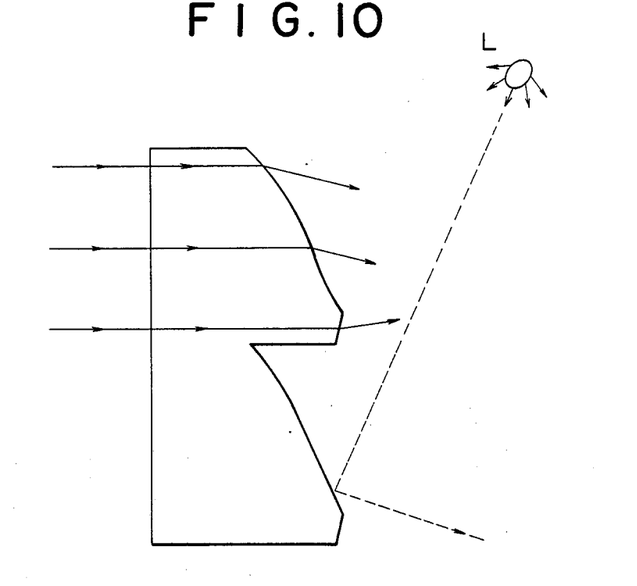
FIG. 10 shows the profile of a prism sheet having a prism function on the light output side thereof.

FIG. 10 shows the profile of a prism sheet having a prism function on the light output side.

The profile shown in FIG. 10 may sometimes cause an external illumination source L on the ceiling to be routed on the optical path indicated by a dotted line, with a light reflected at the light output surface being directed to audiences, depending upon the position of the illumination source L. Therefore, it is necessary to mount the illumination source L on the ceiling at the position which does not result in a reflected light.

Figure 11:
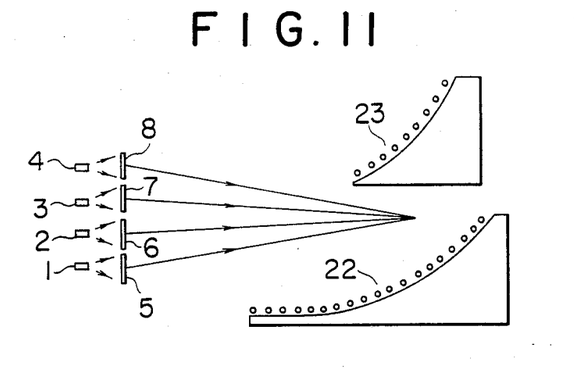
FIG. 11 is a schematic view used for explaining another application of the multi-screen projector using prism sheets according to the present invention.
Figure 12:
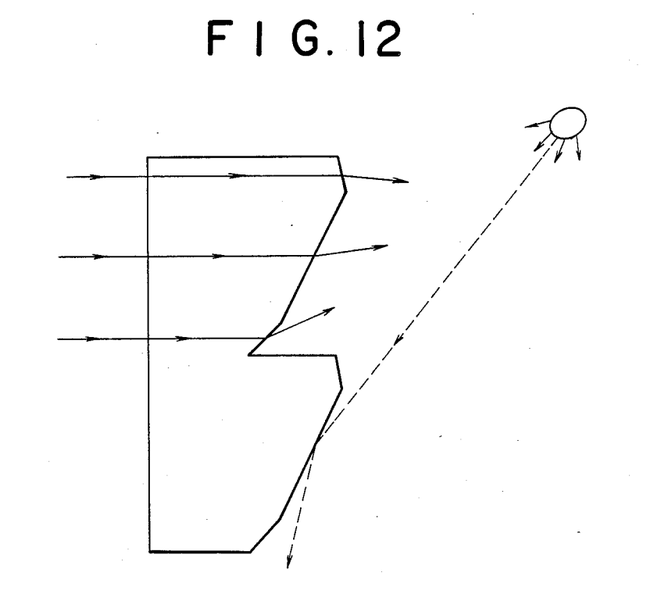
FIG. 12 shows another profile of a prism sheet having a prism function on the light output side thereof.

FIG. 11 illustrates another application of the multi-frame projector using a prism sheet of this invention, wherein audiences 22, 23 are located dispersedly in the vertical direction. Prism sheets having the same light input profile shown in FIG. 5 are used for the unit module screens 7 and 8 shown in FIG. 11, and prism sheets having the same light output profile shown in FIG. 12 are used for the unit module screens 5 and 6. With such an arrangement, interference by reflected lights of ceiling illumination can be suppressed minimum. The characteristic feature of the prism sheet shown in FIG. 12 is that main output lights are adapted to be refracted upward with respective to the horizontal plane.

It can be considered that a unit module screen may be made by using the Fresnel sheet 9 shown in FIG. 2A having the same light input profile as shown in FIG. 5, instead of using the prism sheet shown in FIG. 5. In this case, the following point to be improved must be taken into consideration.

Figure 13:
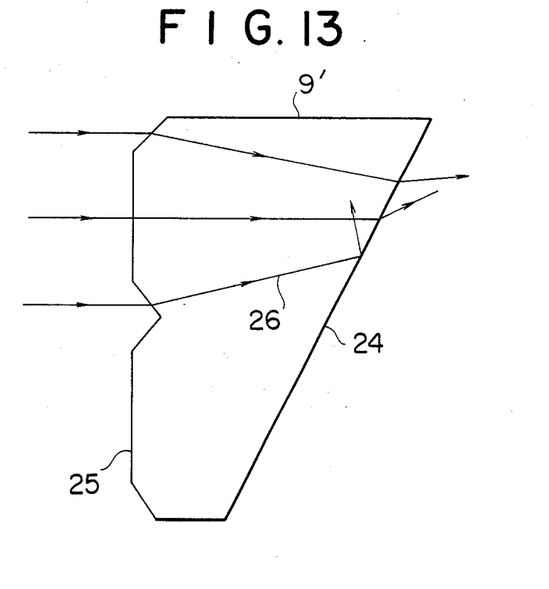
FIG. 13 shows the profile of a Fresnel sheet having a profile of a prism sheet on the light input side of the former.

FIG. 13 shows the profile of a Fresnel sheet 9' which has the profile 25 of a prism sheet on its light input side, and the profile 24 of a Fresnel sheet on its light output side. Reference numeral 26 represents a light beam.

In FIG. 13, a light beam 26 is totally reflected at the inner surface of the Fresnel profile 24. As described previously and although not shown in the drawing, if a unit module projector constructed in a three-tube type has a green projection tube at the center, and red and blue projection tubes at the right and left, then red and blue lights are projected slantwise. Therefore, nonlinearity inherent to the Snell's law appears due to a so-called skew effect. Thus, lights projected from the unit module projector become more liable to undergoing total reflection so that the red and blue color components are deteriorated at corners of the screen of a unit module, with considerable deterioration of color purity.

In consideration of the above, for determining the Fresnel profile and prism profile of a composite sheet having both the Fresnel lens and prism in a single sheet as shown in FIG. 13, it is necessary to avoid total reflection of incident lights.

Figure 14:
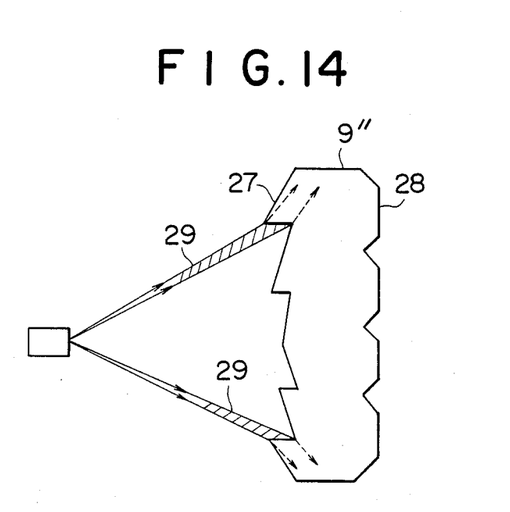
FIG. 14 is a schematic view showing a composite sheet, similar to the Fresnel sheet shown in FIG. 13, made of a Fresnel sheet having a prism function on the light input side of the Fresnel sheet.

FIG. 14 shows another example of a Fresnel sheet having a prism function similar to the case shown in FIG. 13. A composite sheet 9" has the Fresnel profile on its light input side 27 and the prism profile on its light output side 28.

The composite sheet shown in FIG. 14, however, has a loss because light beams indicated at oblique lines are incident to the ineffective area of the Fresnel profile on the light input side 27. Therefore, for determining the Fresnel profile on the light input side 27 and the prism profile on the light output side 28, it becomes necessary to allow the light beams incident to the ineffective area of the Fresnel profile on the input side 27 to be outputted from the light output side 28.

As described above, the unit module screen may be made of a three-sheet structure where all the Fresnel sheet 9, prism sheet 11 and lenticular sheet 10 are separately formed. Alternatively, the unit module screen may be made of a two-sheet structure where a lenticular sheet and a composite sheet of a Fresnel sheet and prism sheet are separately formed.

The description given with reference to FIG. 1 has been assumed that the optimum audience coverage distance is 3H. However, depending upon applications, the optimum audience coverage distance may become more nearer to the screen, e.g., 2H. In this case, the upper unit module screens among the screens 3, 4, 7 and 8 may be effectively tilted downward about 5 degrees to 10 degrees. In the case shown in FIG. 11, the unit module screens may be tilted in accordance with the locations of audiences. The mechanism and operation of tilting a unit module screen has been described with reference to FIG. 2B.

According to the first embodiment of this invention described above, the direction of a main output light at an upper unit module is made downward more than at a lower unit module, and the directivity of a main output light for each unit module is made symmetrical with the same quantity (constant at plus/minus 18 degrees in the cases of FIGS. 4 and 5) in the upper and lower ranges.

A second embodiment of the multi-screen projector of this invention will be next described wherein the directivity of a main output light is made different between upper and lower unit modules, an upper unit module having a wider directivity and a lower unit module having a narrower directivity.

Figure 15:
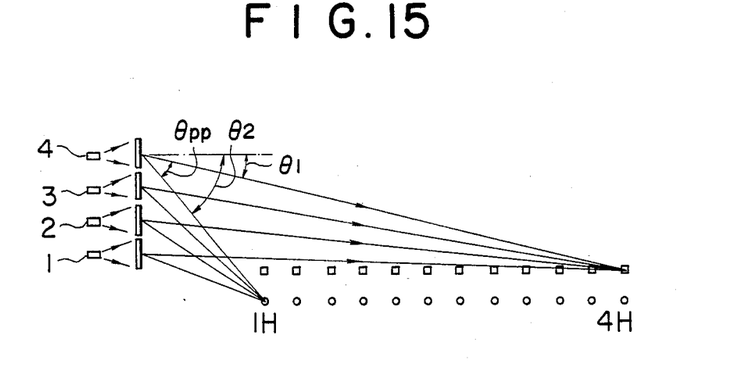
FIG. 15 is a schematic view used for explaining a second embodiment of the multi-screen projector according to the present invention.

FIG. 15 illustrates an example of applications of the second embodiment of this invention, wherein audiences are located at higher and lower horizontal planes throughout the distance from 1H to 4H. Audiences sitting at the height of the lower horizontal plane are indicated by circles, the lower horizontal plane being lower than $\frac{1}{4}$ H from the bottom level of the screen, whereas audiences standing at the height of the higher horizontal plane are indicated by squares, the higher horizontal plane being flush with the bottom level of the screen. The audience coverage range of the highest unit module is given by $\theta_{pp}=\theta_2-\theta_1$ as depicted in FIG. 15, which range is wider than that of the lowest unit module. The values of $\theta_2$, $\theta_1$ and $\theta_{pp}$ of each unit module are as follows:

|  | $\theta_2$ | $\theta_1$ | $\theta_{pp}$ |
|---|---|---|---|
| UNIT MODULE 4 | 48° | 12° | 36° |
| UNIT MODULE 3 | 41° | 9° | 32° |
| UNIT MODULE 2 | 32° | 5° | 27° |
| UNIT MODULE 1 | 21° | 2° | 19° |

It is necessary for each unit module to have a flat directivity over the angle range from $\theta_1$ to $\theta_2$, in order that each unit module can be always viewed at a constant brightness by respective audiences who are located in a two-dimensional distribution with different distance and height relative to the screen. The brightness of an upper unit module screen having a large value of $\theta_{pp}$ becomes insufficient if the same light quantity is applied to all the unit module screens. The brightness difference caused by a difference of $\theta_{pp}$ can be solved by driving an upper unit module projector with a larger power than for a lower unit module projector. However, in order to satisfy the former condition, i.e., in order to satisfy the flat directivity, the profile of a prism sheet must satisfy the specific conditions which will be described below.

Figure 16:
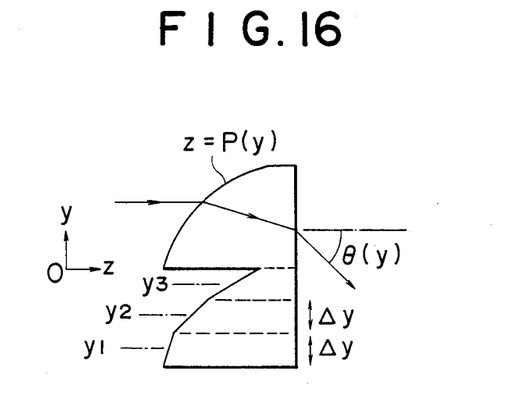
FIG. 16 is a schematic view explaining the profile of a prism sheet used with the second embodiment.

FIG. 16 shows an example of the profile of a prism sheet used with the second embodiment of this invention. The profile in cross section is defined by $z=P(y)$ in the z-y coordinate system shown in FIG. 16. If the incident light height y is given, the gradient dz/dy at that height can be determined and hence the light output direction $\theta(y)$ can be determined in accordance with the Snell's law. With the screen gain as viewed upward in the $\theta$ direction being expressed $G(\theta)$, then $G(\theta)$ must satisfy the following equation in order that the brightness does not depend on the direction $\theta$, i.e., the unit module screen can be viewed at a constant brightness throughout the angle range from $\theta_1$ to $\theta_2$:

$$G(\theta) = K(\text{const}) \text{ for } \theta_1 \leq \theta \leq \theta_2 \tag{3}$$

$G(\theta)$ can be obtained using the profile $z=P(y)$ in accordance with the Lambart law:

$$G(\theta) \propto \frac{\frac{d\theta}{dy}}{\cos \theta} \tag{4}$$

Assuming that the proportionality factor (constant) is 1, the above equation (4) is solved as:

$$dy = \frac{d\theta}{\cos \theta}$$

Through integration, then:

$$y = \frac{1}{2} \ln \frac{1 + \sin \theta}{1 - \sin \theta} = \ln \left( \tan \left( \frac{\pi}{4} + \frac{\theta}{2} \right) \right) \tag{5}$$

where $\theta=0$ corresponds to $y=0$.

By solving $\theta$ as a function of $\alpha$ using the Snell's law previously described as the equation (1) with reference to FIG. 6, then the following equation stands:

$$\sin \theta = n \sin \left( \alpha - \sin^{-1} \left( \frac{\sin \alpha}{n} \right) \right) \tag{6}$$

$$= n \sin \alpha \cos \left( \sin^{-1} \frac{\sin \alpha}{n} \right) - \cos \alpha \sin \alpha$$

$$= n \frac{t}{\sqrt{1+t^2}} \sqrt{1 - \frac{t^2}{n^2(1+t^2)}} - \frac{t}{1+t^2}$$

$$\text{where, } t \equiv \tan \alpha = \frac{dz}{dy} \tag{7}$$

By substituting the equations (6) and (7) into the equation (5), a differential equation is obtained which is then solved by means of numerical calculation to obtain a desired profile expressed by $z=P(y)$.

Another solution method may be used wherein the profile is divided into sections $\Delta y$ having a length of about ⅓ of the pitch as shown in the lower part of FIG. 16, to then obtain the profile approximated by broken lines as in the following.

First, $\theta_i$ is obtained from yi using the equation (5):

$$\frac{\theta_i}{2} = \tan^{-1}(e^{y_i}) - \frac{\pi}{4} \tag{8}$$

Then, $\tan \alpha_i$ is obtained from $\theta_i$ using the equation (1):

$$\frac{dz}{dy} = \tan \alpha_i = \frac{\sin \theta_i}{n \sin \left\{ \cos^{-1} \left( \frac{\sin \theta_i}{n} \right) \right\} - 1} \tag{9}$$

Since dz/dy for each yi can be obtained from the equations (8) and (9), the profile aproximated by broken lines can be obtained easily.

Since the lenticular sheet 10 (FIG. 2A) has a diffusion effect of about plus/minus 6 degrees as described previously, it is sufficient that the division is made into 3 sections($\theta_{pp}/3 \leq 12°$) for broken line approximation. Even if the mold of a prism sheet having a profile made of broken lines is used during manufacturing, the final prism sheet may have a profile made of curves because of removal of acute corners.

According to the second embodiment described above, a uniform directivity within the audience coverage range can be obtained.

The first embodiment is suitable for the case where main audiences are located at the distance three times remote from the screen having a height H. The second embodiment is suitable for the case where audiences are located uniformly at the distance from one to four times remote from the screen having a height H.

The horizontal directivity is detailed in the above-referenced U.S. Pat. No. 4,536,056, so the description therefor is omitted herein.

We claim:
1. A multi-screen projector comprising
   a plurality of unit module projectors piled up one upon another at least in the vertical direction, each of said unit module projector comprising:
   light projection means for projecting a light;

a screen including Fresnel lens means and lenticular means, said light projected from said light projection means being incident to said Fresnel lens means and outputted from said lenticular means; and control means for controlling the vertical directivity range of said light to be outputted from said screen so as to match a view point of an audience viewing said screen at the position remote from said screen by a predetermined distance, wherein said control means includes prism means having a predefined prism angle, said prism means being mounted between said Fresnel lens means and lenticular means, and said prism angle being set larger for said screen which is required to be viewed from said view point at a larger angle of elevation or depression than that for said screen which is required to be viewed at a smaller angle of elevation or depression.

2. A multi-screen projector according to claim 1, wherein said control means further includes means for tilting said unit module projector upward and downward.

3. A multi-screen projector according to claim 1 or 2, wherein said prism means comprises a main part which determines the direction of a main output of said light from said lenticular means, and a side lobe part which determines the width of a vertical directivity angle relative to said main output, said side lobe part being formed such that said width has substantially the same plus/minus directivity angle relative to the main output of said light.

4. A multi-screen projector according to claim 1 or 2, wherein said prism means comprises a main part which determines the direction of a main output of said light from said lenticular means, and a side lobe part which determines the width of a vertical directivity angle relative to said main output, said side lobe part being formed such that said width is wider for said screen which is required to be viewed from said view point at a larger angle of elevation or depression than that for said screen which is required to be viewed at a smaller angle of elevation or depression.

5. A multi-screen projector according to claim 1 or 2, wherein said Fresnel lens means and prism means are formed integrally.

6. A multi-screen projector according to claim 3, wherein the profile defined by said main part and side lobe part is made of broken lines.

7. A multi-screen projector according to claim 4, wherein the profile defined by said main part and side lobe part is made of broken lines.

8. A multi-screen projector according to claim 3, wherein the profile defined by said main part and side lobe part is made of curves.

9. A multi-screen projector according to claim 4, wherein the profile defined by said main part and side lobe part is made of curves.

10. A multi-screen projector comprising:
a plurality of unit module projectors piled up one upon another at least in the vertical direction, each of said unit module projector comprising a screen including Fresnel lens means and lenticular means arranged such that a light is incident to said Fresnel lens means and outputted from said lenticular means; and control means for controlling the vertical directivity range of said light to be outputted from said screen, wherein said control means includes prism means having a predefined prism angle, said prism means being mounted between said Fresnel lens means and lenticular means, and said prism angle being set larger for unit module projector disposed at a higher position than that for said unit module screen disposed at a lower position.

11. A multi-screen projector according to claim 10, wherein said prism angle of said prism means is set such that the main output of said light incident to said prism means becomes parallel with said incident light or is reflected in the direction of angle of depression.

12. A multi-screen projector according to claim 11, wherein said prism means comprises a main part which determines the direction of a main output of said light from said lenticular means, and a side lobe part which determines the width of a vertical directivity angle relative to said main output, said side lobe part being formed such that said width has substantially the same plus/minus directivity angle relative to the main output of said light.

13. A multi-screen projector according to claim 11, wherein said prism means comprises a main part which determines the direction of a main output of said light from said lenticular means, and a side lobe part which determines the width of a vertical directivity angle relative to said main output, said side lobe part being formed such that said width is wider for said unit module projector disposed at a higher position than that for said unit module projector disposed at a lower position.

14. A multi-screen projector according to claim 12 or 13, the profile defined by said main part and side lobe part is made of broken lines.

15. A multi-screen projector according to claim 12 or 13, the profile defined by said main part and side lobe part is made of curves.

16. A multi-screen projector according to claim 12 or 13, wherein said unit module projector comprises means for tilting said unit module projector upward and downward.

17. A multi-screen projector according to claim 12 or 13, wherein an output power from said unit module projector disposed at a higher position is set larger than that from said unit module projector disposed at a lower position.

18. A multi-screen projector according to any one of claims 10, 11, 12 and 13, wherein said prism angle of said prism means is defined on the light incident side thereof.

19. A multi-screen projector according to any one of claims 10, 11, 12 and 13, wherein said Fresnel means and prism means are formed integrally.

20. A multi-screen projector comprising:
a plurality of unit module projectors piled up one upon another at least in the vertical direction, each of said unit module projector comprising a screen including Fresnel lens means and lenticular means arranged such that a light is incident to said Fresnel lens means and outputted from said lenticular means; and control means for controlling the vertical directivity range of said light to be outputted from said screen, said control means including prism means having a predefined prism angle and being mounted between said Fresnel lens means and lenticular means, wherein said plurality of unit module projectors comprise a first and second unit module projector groups arranged such that said first unit module projector group is disposed higher than said second unit module projector group, said first unit module projector group composed of unit module projectors having the prism angle of said prism means of each of which is set such that a main output of said light being incident to said prism means is parallel with said incident light or is deflected in the direction of angle of depression, and that said angle of depression at said unit module projector disposed at a higher position is at least equal to or larger than that at said unit module projector disposed at a lower position, said second unit module projector group composed of unit module projectors having the prism angle of said prism means of each of which is set such that a main output of said light being incident to said prism means is parallel with said incident light or is deflected in the direction of angle of elevation, and that said angle of depression at said unit module projector disposed at a lower position is at least equal to or larger than that at said unit module projector disposed at a higher position.

21. A multi-screen projector according to claim 20, wherein said prism angle of said prism means of said second unit module projector group is defined such that an inclined face of said prism means is formed on the light output side thereof.

22. A multi-screen projector according to claim 21, wherein said inclined face on said prism means of said second unit module projector means is formed in the vertical direction or in the angle-of-elevation direction, relative to the incident light thereto.

23. A multi-screen projector according to any one of claims 20, 21 and 22, wherein said prism means comprises a main part which determines the direction of a main output of said light from said lenticular means, and a side lobe part which determines the width of a vertical directivity angle relative to said main output, said side lobe part being formed such that said width has substantially the same plus/minus directivity angle relative to the main output of said light.

24. A multi-screen projector according to any one of claims 20, 21 and 22, wherein said prism means comprises a main part which determines the direction of a main output of said light from said lenticular means, and a side lobe part which determines the width of a vertical directivity angle relative to said main output, said side lobe part of at least said first unit module projector means being formed such that said width is wider for said unit module projector disposed at a higher position than that for said unit module projector disposed at a lower position.

25. A multi-screen projector according to claim 24, said side lobe part of said second unit module projector group is formed such that said width of a vertical directivity angle relative to said main output of said light from said lenticular means is wide for said unit module projector disposed at a lower position, and narrow for said unit module projector disposed at a higher position.

26. A multi-screen projector according to claim 23, wherein the profile defined by said main part and side lobe part is made of broken lines.

27. A multi-screen projector according to claim 24, wherein the profile defined by said main part and side lobe part is made of broken lines.

28. A multi-screen projector according to claim 25, wherein the profile defined by said main part and side lobe part is made of broken lines.

29. A multi-screen projector according to claim 23, wherein the profile defined by said main part and side lobe part is made of curves.

30. A multi-screen projector according to claim 24, wherein the profile defined by said main part and side lobe part is made of curves.

31. A multi-screen projector according to claim 24, wherein the profile defined by said main part and side lobe part is made of curves.

32. A multi-screen projector according to claim 25, wherein said unit module projector comprises means for tilting said unit module projector upward and downward.

33. A multi-screen projector according to claim 23, wherein said unit module projector comprises means for tilting said unit module projector upward and downward.

34. A multi-screen projector according to claim 24, wherein said unit module projector comprises means for tilting said unit module projector upward and downward.

35. A multi-screen projector according to claim 25, wherein said unit module projector comprises means for tilting said unit module projector upward and downward.

36. A multi-screen projector according to claim 20, wherein the output power of said unit module projector disposed at a higher position is set larger than that of said unit module projector disposed at a lower position.

37. A multi-screen projector according to claim 23, wherein the output power of said unit module projector disposed at a higher position is set larger than that of said unit module projector disposed at a lower position.

38. A multi-screen projector according to claim 24, wherein the output power of said unit module projector disposed at a higher position is set larger than that of said unit module projector disposed at a lower position.

39. A multi-screen projector according to claim 25, wherein the output power of said unit module projector disposed at a higher position is set larger than that of said unit module projector disposed at a lower position.

40. A multi-screen projector according to claim 20, wherein said Fresnel lens means and prism means are formed integrally.

41. A multi-screen projector according to claim 23, wherein said Fresnel lens means and prism means are formed integrally.

42. A multi-screen projector according to claim 24, wherein said Fresnel lens means and prism means are formed integrally.

43. A multi-screen projector according to claim 25, wherein said Fresnel lens means and prism means are formed integrally.

44. A projector apparatus used for forming an image by projecting on a screen viewed from a view point being remote from the screen, said projector apparatus including means for projecting a light of the image, and multiscreen means on which the image is focused, multiscreen means being formed by a plurality of juxtaposed unit screens for diffusing the light from the projecting means, said unit screen comprising:

Fresnel lens means for diffusing the light from said projecting means and outputting said diffused light;

prism means having a predetermined deflection angle relative to an incident light thereto from said Fresnel lens, said deflection angle being set in accordance with an angle between a line interconnecting said unit screen and said view point and a normal line to said multi-screen, said prism means giving the light directing from said multi-screen toward said view point a directivity; and lenticular means for diffusing said light deflected by said prism means.

45. A projector apparatus according to claim 44, wherein the prism angle of said prism means is set such that said deflection angle becomes larger as the angle between said line interconnecting said unit screen and said view point and said normal line to said multi-screen becomes larger.

* * * * *